J. L. CAMPBELL.
Dough-Tray.

No. 217,332.  Patented July 8, 1879.

WITNESSES:
Henry N. Miller
C. Sedgwick

INVENTOR:
J. L. Campbell
BY Munn & Co
ATTORNEYS.

UNITED STATES PATENT OFFICE.

JAMES L. CAMPBELL, OF WEST ELIZABETH, PENNSYLVANIA.

IMPROVEMENT IN DOUGH-TRAYS.

Specification forming part of Letters Patent No. 217,332, dated July 8, 1879; application filed February 13, 1879.

*To all whom it may concern:*

Be it known that I, JAMES LOGAN CAMPBELL, of West Elizabeth, in the county of Allegheny and State of Pennsylvania, have invented a new and useful Improvement in Dough-Trays, of which the following is a specification.

Figure 1:
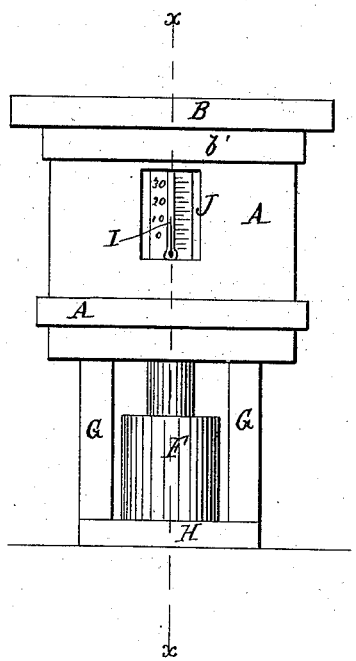
Figure 2:
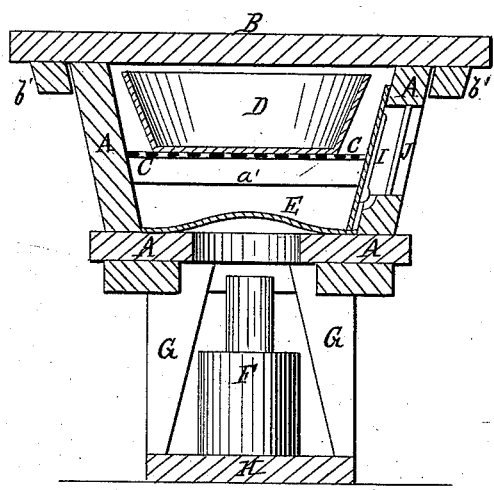

Figure 1 is an end view of my improved dough-tray. Fig. 2 is a vertical longitudinal section of the same, taken through the line $x$ $x$, Fig. 1.

Similar letters of reference indicate corresponding parts.

The object of this invention is to furnish an improved device for use in setting dough to rise.

The invention consists in a covered tray provided with a pan-supporting perforated plate and an upwardly-convex radiating plate, the latter placed over a bottom hole, all as hereinafter described.

A is a box, which is made with vertical sides and inclined or flaring ends, and of any desired or convenient length, breadth, and depth.

B is the cover of the box A, which has cleats $b'$ attached to the lower side of its end parts, so that it may be held securely in place, and may be readily slipped on and off. The cover B is designed to be used as a bread-board for mixing and working the dough.

To the sides of the box A are attached cleats $a'$, upon which rests a perforated sheet-metal plate, C, or a wooden rack for the dough-pan D to rest upon.

The middle part of the bottom of the box A is cut away, and upon the said bottom is placed a sheet-metal plate, E, the middle part of which is concaved upon the lower side and convexed upon the upper side, to better adapt it to concentrate and radiate the heat from the lamp F.

The hole through the bottom of the box A is made so large that the said bottom cannot be set on fire by heat from the lamp F; or the metal plate E may be nailed securely to the base of the tray below the wooden bottom, so that no flame from the lamp can enter the tray.

To the bottom of the box A are secured the upper ends of the legs G, the lower ends of which are attached to a base-board, H. The base-board H serves as a shelf for the lamp F to stand upon.

In using the apparatus, the dough is mixed and placed in the pan D in the usual way. The pan D is then placed upon the perforated plate or rack C, the cover B is put on, and the lamp F is lighted.

I am aware that it is not new to use a dough-tray with a rack to receive the pan; but this is connected with a subjacent water-heater; also, that it is old to use in a bread-rising apparatus a double brake and shield; but I dispense with both of these and employ simply the radiating plate concaved on the under and convexed on the upper side, so as to heat the air that is confined on the inside of close chamber and maintain an equable temperature.

I am aware that it is not, broadly, new to employ a lamp in connection with a suitable receptacle for holding pans of dough, in order to assist the dough in rising.

What I claim, and desire to secure by Letters Patent, is—

The covered tray A B G, forming a close raised chamber, provided with a perforated plate to receive the pan and an upwardly-convex radiating plate arranged over a bottom hole, through which the air confined in the close chamber is heated and maintained at an equable temperature, as described.

JAMES LOGAN CAMPBELL.

Witnesses:
WM. CAMPBELL,
S. H. DALLY.